(12) United States Patent
Mizushima et al.

(10) Patent No.: US 12,547,732 B2
(45) Date of Patent: Feb. 10, 2026

(54) RISK ANALYSIS APPARATUS, METHOD, AND COMPUTER-READABLE MEDIUM

(71) Applicant: NEC Corporation, Tokyo (JP)

(72) Inventors: Ryo Mizushima, Tokyo (JP); Tomohiko Yagyu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 124 days.

(21) Appl. No.: 18/568,330

(22) PCT Filed: Jun. 15, 2021

(86) PCT No.: PCT/JP2021/022650
§ 371 (c)(1),
(2) Date: Dec. 8, 2023

(87) PCT Pub. No.: WO2022/264253
PCT Pub. Date: Dec. 22, 2022

(65) Prior Publication Data
US 2024/0281540 A1   Aug. 22, 2024

(51) Int. Cl.
*G06F 21/57* (2013.01)
(52) U.S. Cl.
CPC ...... *G06F 21/577* (2013.01); *G06F 2221/034* (2013.01)
(58) Field of Classification Search
None
See application file for complete search history.

(56) References Cited

U.S. PATENT DOCUMENTS

| 10,659,488 | B1* | 5/2020 | Rajasooriya | ........ H04L 63/1433 |
| 2005/0138413 | A1* | 6/2005 | Lippmann | ............ G06F 21/577 726/4 |

(Continued)

FOREIGN PATENT DOCUMENTS

| JP | 2005-234840 A | 9/2005 |
| JP | WO2008/004498 A1 | 12/2009 |

(Continued)

OTHER PUBLICATIONS

Anoop Singhal, Zimming Ou, "Security Risk Analysis of Enterprise Networks Using Probabilistic Attack Graphs," NIST Interagency Report 7788, Aug. 2011. (Year: 2011).*

(Continued)

*Primary Examiner* — Kaveh Abrishamkar
(74) *Attorney, Agent, or Firm* — Sughrue Mion, PLLC

(57) ABSTRACT

A configuration information acquisition means acquires configuration information of a system to be analyzed. A threat analysis means analyzes a way of attack that can be implemented in the system to be analyzed. An attack route generation means generates an attack route from the start point to the end point of the attack. A risk value calculation means calculates a risk value of the generated attack route. A result output means outputs a risk analysis result containing the calculated risk value. A risk re-analysis means causes re-analysis of risks for the system in which a security measure planned for the system is introduced to be performed from any one of the configuration information acquisition means, the threat analysis means, the attack route generation means, and the risk value calculation means to conduct re-analysis of risks depending on the security measure planned for the system.

10 Claims, 5 Drawing Sheets

(56) References Cited

U.S. PATENT DOCUMENTS

| | | | | |
|---|---|---|---|---|
| 2005/0193430 | A1* | 9/2005 | Cohen | H04L 63/1433 726/25 |
| 2006/0021050 | A1* | 1/2006 | Cook | H04L 63/1433 726/25 |
| 2013/0347116 | A1* | 12/2013 | Flores | H04L 63/1433 726/25 |
| 2020/0175175 | A1* | 6/2020 | Hadar | G06F 21/70 |
| 2020/0177618 | A1* | 6/2020 | Hassanzadeh | G06F 21/552 |

FOREIGN PATENT DOCUMENTS

| | | | |
|---|---|---|---|
| JP | 2018-077597 A | 5/2018 | |
| JP | 2020-166650 A | 10/2020 | |
| WO | WO-2019036365 A1 * | 2/2019 | H04L 63/1433 |

OTHER PUBLICATIONS

NIST "Guide for Conducting Risk Assessments: Information Security," NIST Special Publication 800-300 Revision 1, Sep. 2012. (Year: 2012).*
NIST Interagency Report 7788 (Year: 2011).*
NIST Special Publication 800-30 Revision 1 (Year: 2012).*
International Search Report for PCT Application No. PCT/JP2021/022650, mailed on Aug. 31, 2021.
JP Office Action for JP Application No. 2024-151498, mailed on Sep. 2, 2025 with English Translation.

* cited by examiner

| COUNTERMEASURE NAME | TYPE OF COUNTERMEASURE | COUNTERMEASURE DETAILS | RETURN POINT |
|---|---|---|---|
| LOG MONITORING | MITIGATION MEASURE | DETECTION/ AWARE OF HARM | RISK VALUE CALCULATION |
| PATCH APPLICATION | FUNDAMENTAL MEASURE | PROTECTION | ATTACK ROUTE GENERATION |
| ... | ... | ... | ... |

| VULNERABILITY | CASES OF HARM | ATTACK VERIFICATION CODE | CVSS |
|---|---|---|---|
| CVE-XXXX-XXXX | YES | YES | 10.0 |
| CVE-YYYY-YYYY | NO | YES | 8.2 |
| ... | ... | ... | ... |

RISK ANALYSIS APPARATUS, METHOD, AND COMPUTER-READABLE MEDIUM

This application is a National Stage Entry of PCT/JP2021/022650 filed on Jun. 15, 2021, the contents of all of which are incorporated herein by reference, in their entirety.

TECHNICAL FIELD

The present disclosure relates to a risk analysis apparatus, a risk analysis method, and a computer-readable medium.

BACKGROUND ART

In recent years, threats of cyber-attacks have not been limited to the fields of ICT (Information and Communication Technology), and cases of harm from such threats have been occurring also in the fields of control systems and IoT (Internet of Things). Particularly, in control systems, there have been cases that pose a threat to the operation of critical infrastructures, such as a shutdown of an electrical power system or plant. To defend against the threats of cyber-attacks, it is important to clarify the security risk of a system, implement countermeasures, and thereby reduce the risk.

As a related art, Patent Literature 1 discloses a risk assessment countermeasure planning system for planning measures against attacks on systems and security tests. A processing apparatus for the risk assessment countermeasure planning system described in Patent Literature 1 analyzes vulnerabilities on the basis of the design information and analyzes threats to systems on the basis of the vulnerability analysis result. The processing apparatus plans countermeasures to reduce the impact of vulnerabilities on the system on the basis of the threat analysis result and the vulnerability information stored in a vulnerability database. The processing apparatus drafts security tests on the basis of the planned countermeasures and evaluates the system on the basis of the security tests.

In performing evaluation on the basis of the security tests, the processing apparatus generates an attack path leading from the origin of the attack to the structural components on the basis of a plurality of structural components of the system, the connection relationship among the plurality of structural components, and the vulnerability information about the structural components. The processing apparatus generates the asset value of each structural component and the probability of occurrence of an event that is a cause of a threat to the system on the basis of the order of the ways of attack present in the attack path, the vulnerability in the ways of attack, and the security test. The processing apparatus plans additional measures to reduce the probability of occurrence of threats to be below the requirements for the asset value.

CITATION LIST

Patent Literature

Patent Literature 1: Japanese Patent Publication No. 2020-166650

SUMMARY OF INVENTION

Technical Problem

Here, in the case a countermeasure against threats of cyber-attacks is planned, re-analysis of risks needs to be performed in order to confirm how the risks change in the case where the countermeasure is introduced into the system. Reanalysis of risks is time and manpower intensive. In addition, upon conducting re-analysis of risks, it is difficult to determine whether it is necessary to perform recalculation of the risk value or review of the threat. For example, it is difficult to determine whether the attack route itself disappears or whether the risk is merely reduced. The re-analysis of risks needs to be performed to determine whether or not the attack route itself has disappeared.

Patent Literature 1 describes that a security test is drafted on the basis of the planned countermeasures, and an evaluation is performed on the basis of the security test. However, it is unclear what kind of security test is generated on the basis of the planned countermeasures from the description of Patent Literature 1. Further, in Patent Literature 1, in order to confirm how the risk changes in the case where the countermeasures are introduced into the system, re-analysis of the risks needs to be performed, which is time and manpower intensive.

In view of the above-described circumstances, an object of the present disclosure is to provide a risk analysis apparatus, a method, and a computer-readable medium each adapted to realize risk analysis at a low cost in the case where countermeasures are introduced.

Solution to Problem

In order to achieve the above object, according to a first aspect of the present disclosure, there is provided a risk analysis apparatus. The risk analysis apparatus includes: configuration information acquisition means for acquiring configuration information of a system to be analyzed: threat analysis means for analyzing a way of attack that can be implemented in the system on the basis of the configuration information and vulnerability information: attack route generation means for generating an attack route from a start point to an end point of the attack on the basis of the configuration information and the way of attack: risk value calculation means for calculating a risk value of the attack route: result output means for outputting a risk analysis result containing the calculated risk value: and risk re-analysis means for causing re-analysis of risks for the system in which a security measure planned for the system is introduced to be conducted from any one of the configuration information acquisition means, the threat analysis means, the attack route generation means, and the risk value calculation means depending on the security measure planned for the system.

According to a second aspect of the present disclosure, there is provided a risk analysis method. The risk analysis method, includes: conducting risk analysis for a system to be analyzed, the risk analysis including a configuration information acquisition phase to acquire configuration information, a threat analysis phase to analyze a way of attack that can be implemented in the system on the basis of the configuration information and vulnerability information, an attack route generation phase to generate an attack route from the start point to the end point of the attack based on the configuration information and the way of attack, and a risk value calculation phase to calculate a risk value of the attack route: outputting a risk analysis result containing the calculated risk value: and conducting re-analysis of risks for the system in which a security measure planned for the system is introduced from any one of the configuration information acquisition phase, the threat analysis phase, the attack route generation phase, and the risk value calculation phase depending on the security measure planned for the system.

According to a third aspect of the present disclosure, there is provided a computer-readable medium. The computer-readable medium stores a program for causing a computer to execute processes of: conducting risk analysis including a configuration information acquisition phase to acquire configuration information, a threat analysis phase to analyze a way of attack that can be implemented in the system on the basis of the configuration information and vulnerability information, an attack route generation phase to generate an attack route from the start point to the end point of the attack based on the configuration information and the way of attack, and a risk value calculation phase to calculate a risk value of the attack route: outputting a risk analysis result containing the calculated risk value: and conducting re-analysis of risks for the system in which a security measure planned for the system is introduced from any one of the configuration information acquisition phase, the threat analysis phase, the attack route generation phase, and the risk value calculation phase depending on the security measure planned for the system.

Advantageous Effects of Invention

A risk analysis apparatus, a method, and a computer-readable medium according to the present disclosure are each adapted to conduct risk analysis at a low cost in the case where countermeasures are introduced.

EXAMPLE EMBODIMENT

Figure 1:
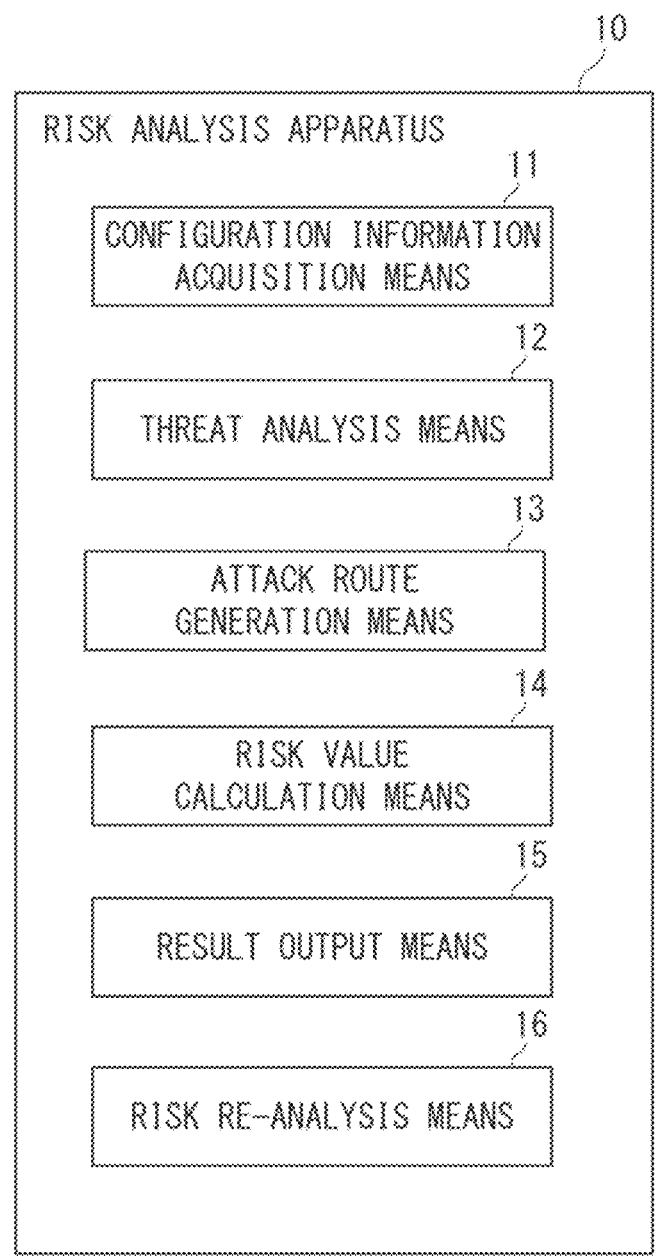
FIG. 1 is a block diagram showing a schematic configuration of a risk analysis apparatus according to the present disclosure.

Prior to describing an example embodiment of the present disclosure, an overview of the present disclosure will be described. FIG. 1 shows a schematic configuration of a risk analysis apparatus according to the present disclosure. A risk analysis apparatus 10 includes configuration information acquisition means 11, threat analysis means 12, attack route generation means 13, risk value calculation means 14, result output means 15, and risk re-analysis means 16. The configuration information acquisition means 11 acquires configuration information of a system to be analyzed. The threat analysis means 12 analyzes the way of attack that can be implemented in the system to be analyzed on the basis of the acquired configuration information and vulnerability information.

The attack route generation means 13 generates an attack route from the start point of the attack to the end point of the attack on the basis of the acquired configuration information and the analyzed way of attack. The risk value calculation means 14 calculates the risk value of the generated attack route. The result output means 15 outputs a risk analysis result containing the calculated risk value. Depending on a security measure planned for the system, the risk re-analysis means 16 causes re-analysis for the system in which the security measure is introduced to be conducted from any of the configuration information acquisition means 11, the threat analysis means 12, the attack route generation means 13, and the risk value calculation means 14.

In the present disclosure, the risk re-analysis means 16 causes re-analysis to be conducted from any of the configuration information acquisition means 11, the threat analysis means 12, the attack route generation means 13, and the risk value calculation means 14 depending on the security measures planned for the system to be analyzed. In other words, it can be said that the risk re-analysis means 16 determines, depending on the security measures, to which stage to return to and conduct the risk analysis. In the present disclosure, by conducting re-analysis of the risks from the determined stage, re-analysis of the risks in the case where the security measures are introduced can be conducted at a low cost.

Example embodiments of the present disclosure will be described below with reference to the drawings. The following descriptions and drawings have been omitted and simplified as appropriate for clarity of explanation. In the following drawings, the same elements and similar elements have the same reference numerals, and duplicate explanations have been omitted as necessary.

Figure 2:
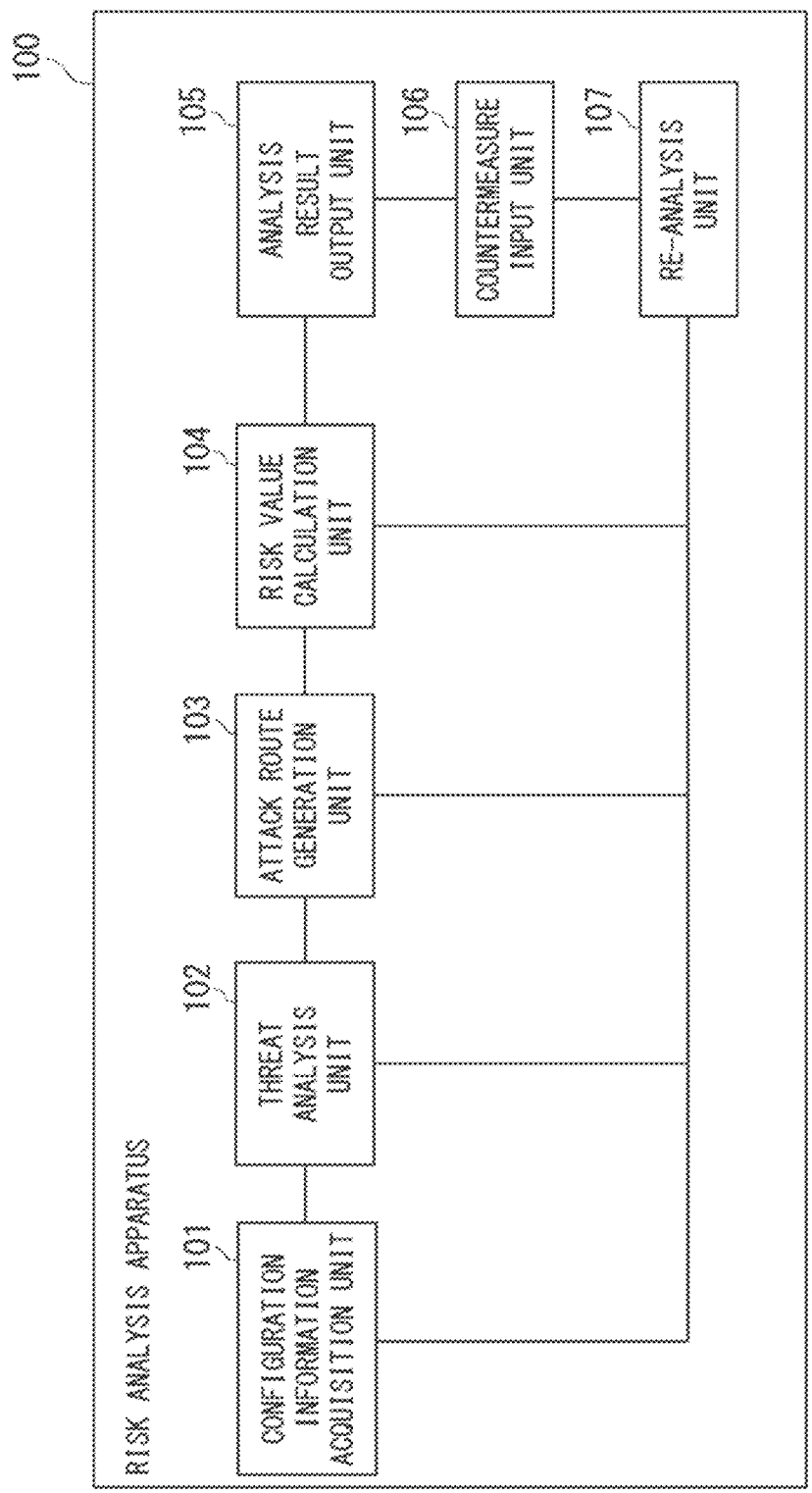
FIG. 2 is a block diagram showing a risk analysis apparatus according to a first example embodiment of the present disclosure.

FIG. 2 shows a risk analysis apparatus according to a first example embodiment of the present disclosure. A risk analysis apparatus 100 includes a configuration information acquisition unit 101, a threat analysis unit 102, an attack route generation unit 103, a risk value calculation unit 104, an analysis result output unit 105, a countermeasure input unit 106, and a re-analysis unit 107. The functions of each element in the risk analysis apparatus 100 can be implemented by, for example, having a computer apparatus perform processing according to a program. The risk analysis apparatus 100 corresponds to the risk analysis apparatus 10 shown in FIG. 1.

The configuration information acquisition unit 101 acquires configuration information of the system to be analyzed. The configuration information includes, for example, information on each of assets that form a system, a network configuration, vulnerability, an open port, account information, and information about software. The threat analysis unit 102 analyzes possible threats in the system to be analyzed. The threat analysis unit 102 analyzes, for example, the way of attack that an attacker can use in the system to be analyzed. The configuration information acquisition unit 101 corresponds to configuration information acquisition means 11 shown in FIG. 1, and the threat analysis unit 102 corresponds to the threat analysis unit 102 shown in FIG. 1.

The attack route generation unit 103 searches for an attack route in the system to be analyzed. For example, several attack scenarios are assumed in the analysis of security risks. The attack scenarios include, for example, the entry point used for the attack, the ultimate target, and the type of ultimate attack. The attack route generation unit 103 deductively infers attack steps based on the attack conditions for the attack scenario by referring to the configuration information of the system and searches for the attack route. The attack steps included in the attack route include an attack source, an attack target, and a way of attack. A graph that represents the attack steps and the conditions for each attack step in the attack route in a graphical format is called an attack graph or an attack tree. The attack route generation unit 103 corresponds to the attack route generation means 13 shown in FIG. 1.

The risk value calculation unit 104 calculates a risk value in the system to be analyzed. For example, the risk value calculation unit 104 may calculate a risk value for each attack route generated by the attack route generation unit 103. The risk value calculation unit 104 may calculate a risk value for the attack steps of the attack route. The risk value calculation unit 104 corresponds to the risk value calculation means 14 shown in FIG. 1.

The analysis result output unit 105 outputs a risk analysis result of the system to be analyzed. The analysis result output unit 105 displays, for example, the risk value calculated for each attack route by the risk value calculation unit 104 on a display apparatus, which is not shown. The analysis result output unit 105 may, for example, highlight and display an attack route having a higher risk value than that of another attack route in a more emphasized manner than the attack route having the lower risk value. The analysis result output unit 105 corresponds to the result output means 15 shown in FIG. 1.

The user refers to the risk analysis result output by the analysis result output unit 105, and plans countermeasures to at least mitigate the threats present in the system to be analyzed. The countermeasure input unit 106 inputs countermeasures against the threats present in the system to be analyzed. The countermeasure input unit 106 includes an input device, such as a keyboard, a mouse, and a touch panel, and the user can operate the input device to input countermeasures into the risk analysis apparatus 100. A plurality of countermeasures can be input through the countermeasure input unit 106.

When a countermeasure is input, the re-analysis unit 107 performs re-analysis of the security risk of the system to be analyzed in the case where the countermeasure is introduced. The risk analysis includes a configuration information collection phase, a threat analysis phase, an attack route generation phase, and a risk value calculation phase. The configuration information collection phase, the threat analysis phase, the attack route generation phase, and the risk value calculation phase correspond to the configuration information acquisition unit 101, the threat analysis unit 102, the attack route generation unit 103, and the risk value calculation unit 104, respectively. In performing re-analysis of the security risk, the re-analysis unit 107 determines from which phase the risk analysis is to be conducted depending on the countermeasures input from the countermeasure input unit 106. For example, the re-analysis unit 107 refers to a countermeasure information table in which the type of the countermeasures and the phase to conduct re-analysis are stored in correspondence with each other, and determines from which phase the risk analysis is to be conducted depending on the input countermeasures. The re-analysis unit 107 corresponds to the risk re-analysis means 16 shown in FIG. 1.

Figures 3, 4:
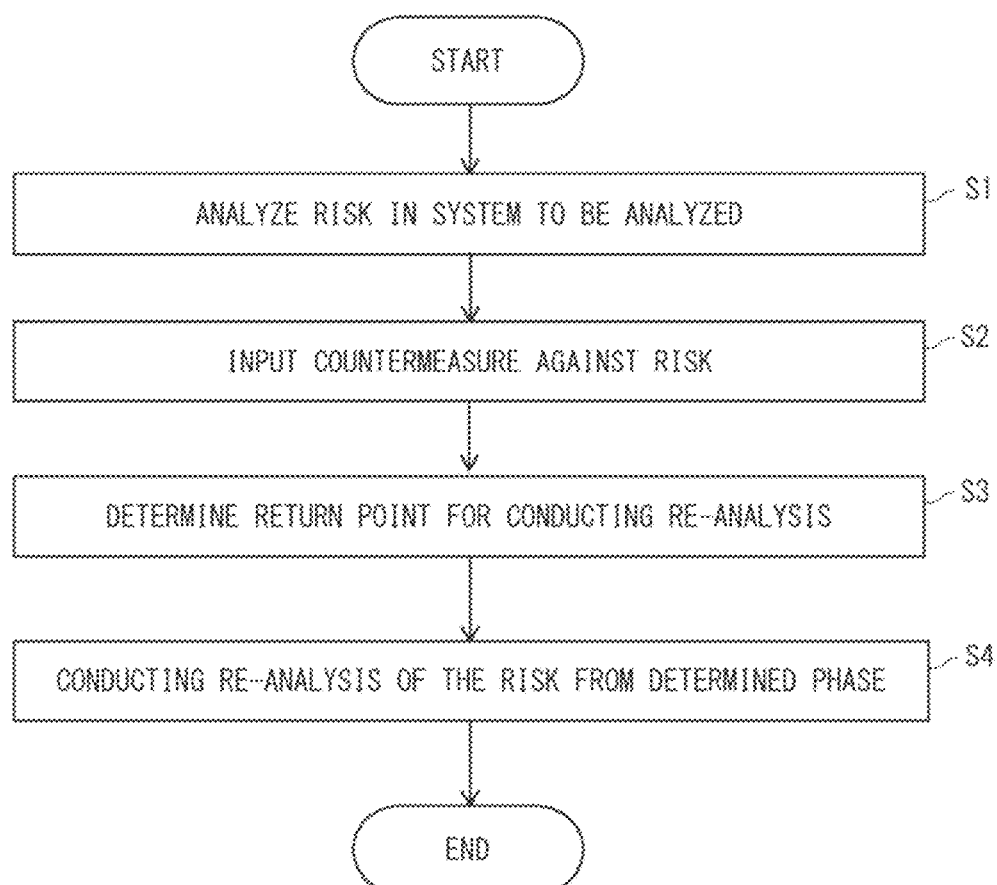
FIG. 3 is a diagram showing an example of a countermeasure information table.
FIG. 4 is a flowchart showing an operation procedure of a risk analysis apparatus.

FIG. 3 shows an example of a countermeasure information table. The countermeasure information table contains a countermeasure name, a countermeasure type, countermeasure details, and a return point. A countermeasure type indicates the type of security countermeasure identified by a countermeasure name. A countermeasure type includes, for example, mitigation measures and fundamental measures. Mitigation measures indicate, for example, security measures that cannot eliminate the threat in the system to be analyzed but can mitigate the impact of the threat. Fundamental measures indicate security measures that can at least partially eliminate the threat in the system to be analyzed. Countermeasure details indicate the details of the security measures identified by the countermeasure names.

In the countermeasure information table, a return point indicates the phase to conduct re-analysis in the re-analysis process. A return point is defined, for example, in correspondence with the countermeasure identified by the countermeasure name. For example, configuration information collection is defined as a return point for the countermeasure that, when introduced, would significantly change the system configuration. Threat analysis is defined as a return point for a countermeasure that, when introduced, would significantly change the number of threats. Attack route generation is defined as a return point for the countermeasure that, when introduced, would decrease specific threats. Risk value calculation is defined as a return point for the countermeasure that, when introduced, would change the risk value.

The re-analysis unit 107 refers to the countermeasure information table and acquires information about the return point for the countermeasure input from the countermeasure input unit 106. The re-analysis unit 107 determines the phase to conduct re-analysis according to the acquired return point. For example, the re-analysis unit 107 determines that the risk analysis is to be conducted again from the risk value calculation for the security measure having a countermeasure name "log monitoring". The re-analysis unit 107 determines that the risk analysis is to be conducted again from the attack route generation for the security measure having a countermeasure name "patch application".

Although an example in which a return point is defined for each security countermeasure (countermeasure name) has been described above, this example embodiment is not limited thereto. The return point may be defined in correspondence with the countermeasure type. In such a case, the re-analysis unit 107 may obtain the countermeasure type by referring to a table (a first table) in which the countermeasure name and the countermeasure type are associated with each other, and may obtain the return point by referring to another table (a second table) in which the countermeasure type and the return point are associated with each other. In addition to the countermeasure type, the re-analysis unit 107 may determine the return point according to the countermeasure details.

Next, the operation procedure will be described. FIG. 4 shows the operation procedure of a risk analysis apparatus (a risk analysis method). The risk analysis apparatus 100 analyzes the risk in the system to be analyzed (Step S1). In Step S1, the configuration information acquisition unit 101 acquires configuration information of the system to be analyzed. The attack route generation unit 103 searches for an attack route in the system to be analyzed. The risk value calculation unit 104 calculates the risk value of each attack route. The analysis result output unit 105 outputs the risk analysis result of the system to be analyzed.

The user plans a security measure by referring to the output risk analysis result. The countermeasure input unit 106 inputs the measure planned by the user to the re-analysis unit 107 (Step S2). The re-analysis unit 107 determines the return point for conducting re-analysis of risks depending on the input countermeasure (Step S3). In Step S3, the re-analysis unit 107 determines the return point corresponding to the countermeasure type of the input countermeasure by referring to, for example, the countermeasure information table (see, FIG. 3). The re-analysis unit 107 conducts re-analysis of the risk in the case where the countermeasure is introduced from the phase corresponding to the determined return point (Step S4). The analysis result output unit 105 outputs the risk analysis result of the system to be analyzed obtained by performing re-analysis.

For example, in the case where a mitigation measure is introduced, the way of attack that may be utilized and the attack routes in the system to be analyzed are not expected to change. In such a case, it is considered that risk analysis should be performed again from calculation of the risk value. The re-analysis unit 107 instructs the risk value calculation unit 104 to perform risk value calculation thereby causing re-analysis of risks to be conducted from the risk value calculation. In the case where fundamental measures are introduced, it is considered that the specific attack step becomes unavailable and thereby the attack route changes. In such a case, it is considered that risk analysis should be performed again from generation of the attack route. The re-analysis unit 107 instructs the attack route generation unit 103 to generate an attack route, thereby causing re-analysis of risks to be conducted from the attack route generation. In performing re-analysis, the attack route generation unit 103 invalidates a specific threat in the host or terminal against which countermeasures have been taken, and generates an attack route.

The re-analysis unit 107 can also determine the return point according to the point where countermeasures are implemented in the system to be analyzed. For example, if a plurality of security measures are taken at the entry point or the host of the attack target, the risk value of the attack route is lowered, whereby the re-analysis unit 107 may determine the risk value calculation as the return point. If security measures are taken at the connection terminals, the connection terminals may not be able to be attacked, so the re-analysis unit 107 may determine threat analysis as a return point. The re-analysis unit 107 may determine risk value calculation as the return point because there is a high probability that the work terminal or the like will not be hijacked if fundamental measures are introduced into the host serving as a stepping stone for the attack. The re-analysis unit 107 may determine threat analysis as a return point because the vulnerability of the system varies significantly for countermeasures which involve upgrading of an OS version.

In general, if all the attack routes are to be listed upon reviewing the attack routes, the number of attack routes will be enormous. Therefore, the attack route generation unit 103 usually limits the number of hops from the start point to the end point of attack, and extracts attack routes up to a predetermined number of hops (the first number of hops). For example, if more than a certain number of fundamental measures are introduced for an asset, it is considered that an attack via the asset is not possible, and the attack route is eliminated. Therefore, in performing re-analysis, in the review of the attack route, the number of hops may be increased from a normal number of hops (the first hop number) and the range of review of the attack route may be expanded from the range of review in the previous risk analysis. For example, the attack route generation unit 103 may generate the attack route up to a second hop number which is larger than the normal number of hops (the first hop number). In such a case, it is possible to perform risk analysis for attack routes that are detours and were not reviewed in the previous risk analysis.

In this example embodiment, the re-analysis unit 107 determines the return point of risk re-analysis depending on the countermeasures input to the countermeasure input unit 106. For example, in the case where it is considered that there is no change in the way of attack for a certain countermeasure, risk analysis can be redone from a risk value calculation. In addition, since it is considered that there is a decrease in the number ways of attack for other countermeasures, risk analysis can be redone from a threat analysis. By referring to the risk re-analysis result, the user can, for example, confirm that applying a security patch eliminates the vulnerability of the system and prevents attacks exploiting the vulnerability.

In this example embodiment, since determination is made as to the phase in which risk analysis is carried out in the case where measures are taken in accordance with the countermeasures, it is possible to reduce the time and manpower required to perform re-analysis of risks for the planned countermeasures. Therefore, in this example embodiment, changes in risks can be confirmed with minimal processing for the planned designed countermeasures. Moreover, in this example embodiment, since risk analysis can be conducted at a low cost in the case where countermeasures are implemented, it is possible to plan a plurality of countermeasures and confirm how much risk is reduced for each of the planned countermeasures. Therefore, the user can compare the risk reduction effects of the plurality of countermeasures and find a countermeasure having a high risk-reduction effect.

Figure 5:
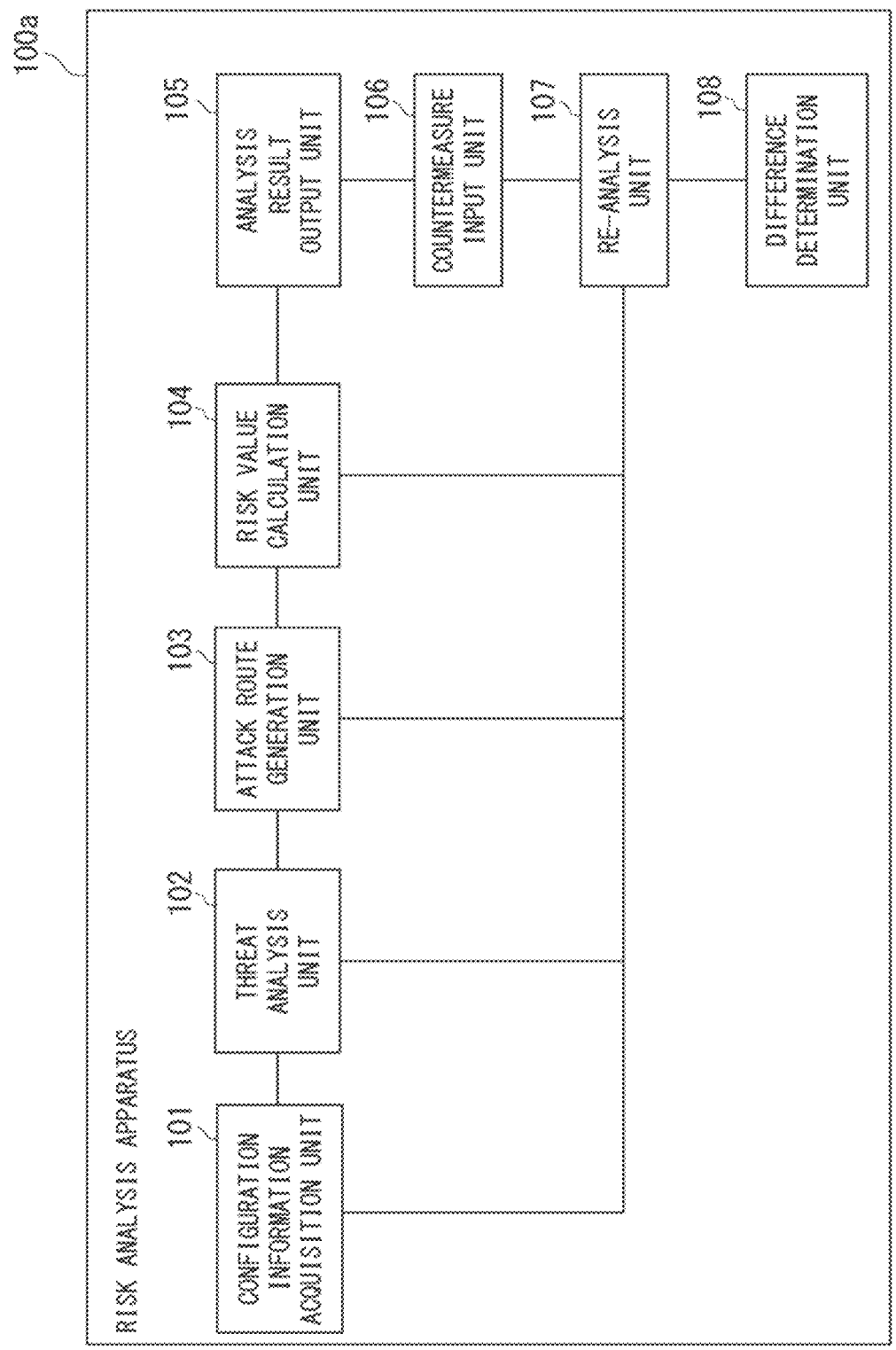
FIG. 5 is a block diagram showing a risk analysis apparatus according to a second example embodiment of the present disclosure.

Next, a second example embodiment of the present disclosure will be described. FIG. 5 shows a risk analysis apparatus according to the second example embodiment of the present disclosure. A risk analysis apparatus 100a according to this example embodiment has a configuration same as that of the risk analysis apparatus 100 shown in FIG. 2, and further includes a difference determination unit 108. The difference determination unit (difference determination means) 108 determines, for example whether or not there has been any change in at least one of the configuration information and the vulnerability information. The difference determination unit 108 determines, for example, on a periodic basis, whether or not there has been any change in the configuration information and the vulnerability information.

In this example embodiment, the re-analysis unit 107 performs risk analysis on a periodic basis, for example, at predetermined time intervals. The difference determination unit 108 determines, for example, whether or not there has been any change in the vulnerability information since the vulnerability information which was obtained in the previous risk analysis. When it is determined that there has been a change in the vulnerability information, the re-analysis unit 107 determines from which phase the risk analysis is to be conducted depending on the contents of the change.

Figures 6, 7:
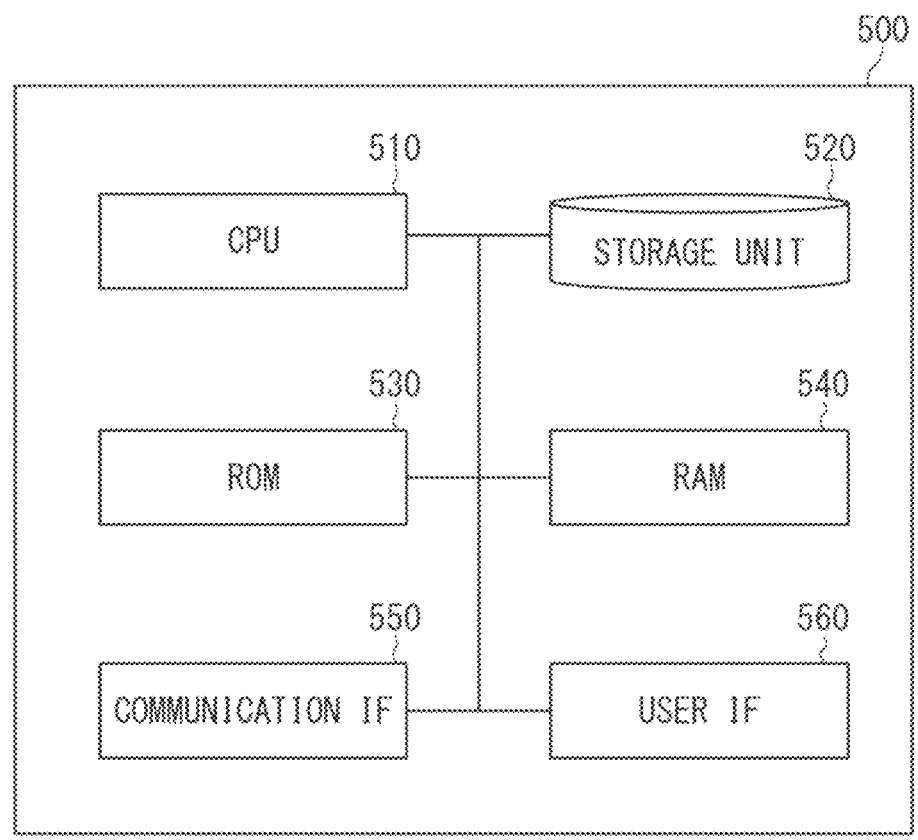
FIG. 6 is a diagram showing an example of vulnerability information.
FIG. 7 is a block diagram showing a configuration example of a computer apparatus.

FIG. 6 shows an example of the vulnerability information. The vulnerability information includes a vulnerability identifier, presence or absence of cases of harm, the existence of an attack verification code, and the Common Vulnerability Scoring System (CVSS). The Common Vulnerabilities and Exposures (CVE) can be used as a vulnerability identifier. CVSS indicates the vulnerability severity score.

The difference determination unit 108 compares the vulnerability information obtained in the previous risk analysis with the vulnerability information obtained in the current risk analysis. The difference determination unit 108 determines, for example, that a new vulnerability has been added between the time of the previous risk analysis and the time of the current risk analysis. When a new vulnerability is found, a new attack exploiting the vulnerability may become possible. When it is determined that a new vulnerability has been added, the re-analysis unit 107 determines threat analysis as a return point. In such a case, the re-analysis unit 107 instructs the threat analysis unit 102 to conduct threat analysis.

The difference determination unit 108 determines that for a certain vulnerability, the cases of harm have changed from "none" to "yes" or the attack verification code has changed from "none" to "yes" between the time of the previous risk analysis and the time of the current risk analysis. In the case where a case of harm or an attack verification code is found, it is considered that the way of attack itself does not change, but the risk value changes. When it is determined that a case of harm or an attack verification code is found, the re-analysis unit 107 determines risk value calculation as a return point. In such a case, the re-analysis unit 107 instructs the risk value calculation unit 104 to perform risk value calculation.

The difference determination unit 108 compares the configuration information obtained in the previous risk analysis with the configuration information obtained in the current risk analysis. The difference determination unit 108 determines that there has been a change in the configuration information in the case where, for example, the firewall settings have been changed, a subnetwork has been added, or the network configuration has been changed. When it is determined that there has been a change in the configuration information, the re-analysis unit 107 determines configuration information collection as a return point. In such a case, the re-analysis unit 107 instructs the configuration information acquisition unit 101 to perform configuration information acquisition.

The re-analysis unit 107 may cause re-analysis of risks to be conducted from the threat analysis for a specific segment in the case where an OS update is performed in any terminal, in the case where a new terminal is installed, or in the case where the location of the terminal has changed. In such a case, the threat analysis unit 102 may analyze the possibility of an attack on a terminal such as a new terminal and the possibility of an attack from a terminal such as a new terminal. The re-analysis for the countermeasure input from the countermeasure input unit 106 in this example embodiment may be the same as the re-analysis performed in the first example embodiment.

In this example embodiment, the difference determination unit 108 determines changes in the configuration information and the vulnerability information. In the case where there are changes in the configuration information and the vulnerability information, the re-analysis unit 107 determines the return point of risk re-analysis according to the contents of the change. For example, in the case where there has been a change in an item of the vulnerability information used for risk value calculation, the re-analysis unit 107 determines a phase to perform the risk value calculation as a return point. Further, in the case where a new vulnerability emerges, the re-analysis unit 107 determines a phase to perform the threat analysis as a return point. In this way, it is possible to confirm, with minimal processing, how the risk changes in the case where the information on which the analysis is based changes. Other effects of the present disclosure are similar to those described in the first example embodiment.

In each of the example embodiments described above, examples of determining the phase to start re-analysis in response to the input countermeasures or changes in the configuration information and vulnerability information have been described. However, the present disclosure is not limited thereto. For example, if the user wishes to perform risk analysis from the beginning, the re-analysis unit 107 may cause re-analysis from the configuration information collection.

In the above second example embodiment, an example has been given in which the re-analysis unit 107 conducts re-analysis in the case where countermeasures are input and re-analysis in the case where there has been a change in the configuration information or the vulnerability information. However, the present disclosure is not limited thereto. In the second example embodiment, the re-analysis in the case where countermeasures are input may be omitted and only re-analysis in the case where there has been a change in the configuration information or vulnerability information may be conducted.

Next, the physical configuration of the risk analysis apparatus 100 will be described. FIG. 7 shows an example of a configuration of a computer apparatus that can be used as the risk analysis apparatus 100. A computer apparatus 500 includes a control unit (CPU: Central Processing Unit) 510, a storage unit 520, a ROM (Read Only Memory) 530, a RAM (Random Access Memory) 540, a communication interface (IF: Interface) 550, and a user interface 560.

The communication interface 550 is an interface for connecting the computer apparatus 500 to a communication network via a wired communication means or a wireless communication means. The user interface 560 includes a display unit such as a display. The user interface 560 also includes an input unit such as a keyboard, a mouse, and a touch panel.

The storage unit 520 is an auxiliary storage apparatus capable of holding various kinds of data. The storage unit 520 need not necessarily be a part of the computer apparatus 500, but may be an external storage apparatus or cloud storage connected to the computer apparatus 500 via a network.

The ROM 530 is a nonvolatile storage apparatus. For the ROM 530, a semiconductor storage apparatus such as a flash memory having a relatively small capacity is used. The program executed by the CPU 510 may be stored in the storage unit 520 or the ROM 530. The storage unit 520 or the ROM 530 stores various programs for implementing the functions of each element in the risk analysis apparatus 100, for example.

The programs include instructions (or software code) for causing the computer to perform one or more of the functions described in example embodiment when read into the computer. The programs may be stored in a non-temporary computer-readable medium or a substantial storage medium. By way of example, but not limitation, a computer-readable medium or substantial storage medium includes random-access memory (RAM), read-only memory (ROM), flash memory, solid-state drive (SSD) or other memory technology, compact disc (CD), digital versatile disc (DVD), Blu-ray disc or other optical disc storage, magnetic cassette, magnetic tape, magnetic disc storage or other magnetic storage device. The program may be transmitted on a temporary computer-readable medium or communication medium. By way of example, but not limitation, a temporary computer-readable medium or communication medium includes an electrical, optical, acoustic, or other form of propagating signal.

The RAM 540 is a volatile storage apparatus. Various semiconductor memory devices such as DRAM (Dynamic Random Access Memory) or SRAM (Static Random Access Memory) are used for the RAM 540. The RAM 540 can be used as an internal buffer for temporarily storing data, etc. The CPU 510 develops, on the RAM 540, a program stored in the storage unit 520 or the ROM 530 and executes it. The CPU 510 executes a program, whereby functions of each element of the risk analysis apparatus 100 can be implemented. The CPU 510 may have an internal buffer that can temporarily store data, etc.

While the present disclosure has been described in detail with reference to example embodiments thereof, the present disclosure is not limited to the above-described example embodiments, and various changes and modifications may be made therein without departing from the spirit and scope of the present disclosure.

REFERENCE SIGNS LIST

10: RISK ANALYSIS APPARATUS
11: CONFIGURATION INFORMATION ACQUISITION MEANS
12: THREAT ANALYSIS MEANS
13: ATTACK ROUTE GENERATION MEANS
14: RISK VALUE CALCULATION MEANS
15: RESULT OUTPUT MEANS
16: RISK RE-ANALYSIS MEANS
100: RISK ANALYSIS APPARATUS
101: CONFIGURATION INFORMATION ACQUISITION UNIT
102: THREAT ANALYSIS UNIT
103: ATTACK ROUTE GENERATION UNIT
104: RISK VALUE CALCULATION UNIT
105: ANALYSIS RESULT OUTPUT UNIT
106: COUNTERMEASURE INPUT UNIT
107: RE-ANALYSIS UNIT
108: DIFFERENCE DETERMINATION UNIT
500: COMPUTER APPARATUS
510: CPU
520: STORAGE UNIT
530: ROM
540: RAM
550: COMMUNICATION IF
560: USER IF

What is claimed is:

1. A risk analysis apparatus comprising:
a memory storing instructions; and
a processor configured to execute the instructions to:
acquire configuration information of a system to be analyzed during a configuration information acquisition phase;
analyze a way of attack implementable in the system based on the configuration information and vulnerability information during a threat analysis phase;
generate a first attack route from a start point to an end point of an attack based on the configuration information and the way of attack during an attack route generation phase;
calculate a risk value of the first attack route during a risk value calculation phase;
output a risk analysis result comprising the calculated risk value;
in response to a security measure planned for the system, conduct a first re-analysis of risks by selecting a first re-analysis return point from the configuration information acquisition phase, the threat analysis phase, the attack route generation phase, or the risk value calculation phase based on the planned security measure, and initiating the first re-analysis from the selected first re-analysis return point;
detect a change in the vulnerability information or the configuration information; and
in response to detecting the change, conduct a second re-analysis of risks by selecting a second re-analysis return point from the configuration information acquisition phase, the threat analysis phase, the attack route generation phase, or the risk value calculation phase based on the content of the detected change,
wherein generating the first attack route comprises generating the first attack route up to a first hop number, and
wherein conducting the first re-analysis or the second re-analysis comprises generating the first attack route up to a second hop number greater than the first hop number.

2. The risk analysis apparatus according to claim 1, wherein the processor is configured to determine, according to a type of the planned security measure, one of the configuration information acquisition phase, the threat analysis phase, the attack route generation phase, or the risk value calculation phase as the first re-analysis return point, and to conduct the first re-analysis of risks from the determined first re-analysis return point.

3. The risk analysis apparatus according to claim 2, wherein the processor is configured to execute the instructions to cause the risk analysis apparatus to acquire the first re-analysis return point corresponding to the planned security measure by referencing a countermeasure information table that associates the type of the planned security measure with the first re-analysis return point, and to conduct the first re-analysis of risks from the acquired first re-analysis return point.

4. The risk analysis apparatus according to claim 1, wherein the processor is configured to execute the instructions to cause the risk analysis apparatus to determine, on a periodic basis, whether there has been a change in at least one of the vulnerability information or the configuration information.

5. The risk analysis apparatus according to claim 1, wherein based on the second re-analysis return point being the risk value calculation phase, the configuration information acquired in the configuration information acquisition phase of a preceding analysis, the way of attack analyzed in the threat analysis phase of the preceding analysis, and the first attack route generated in the attack route generation phase of the preceding analysis are reused in the second re-analysis, and
wherein the processor is configured to execute the instructions to cause the risk analysis apparatus to calculate, in the risk value calculation phase of the second re-analysis, a new risk value of the first attack route.

6. The risk analysis apparatus according to claim 1, wherein based on the second re-analysis return point being the attack route generation phase, the configuration information acquired in the configuration information acquisition phase of a preceding analysis and the way of attack analyzed in the threat analysis phase of the preceding analysis are reused in the second re-analysis, and
wherein the processor is configured to execute the instructions to cause the risk analysis apparatus to:
generate, in the attack route generation phase of the second re-analysis, a new attack route based on the configuration information and the way of attack; and calculate, in the risk value calculation phase of the second re-analysis, a risk value of the new attack route.

7. The risk analysis apparatus according to claim 1, wherein based on the second re-analysis return point being the threat analysis phase, the configuration information acquired in the configuration information acquisition phase of a preceding analysis is reused in the second re-analysis, and wherein the processor is configured to execute the instructions to cause the risk analysis apparatus to:
analyze, in the threat analysis phase of the second re-analysis, a new way of attack based on the configuration information and vulnerability information;
generate, in the attack route generation phase of the second re-analysis, a new attack route based on the configuration information and the new way of attack; and
calculate, in the risk value calculation phase of the second re-analysis, a risk value of the new attack route.

8. The risk analysis apparatus according to claim 1, wherein based on the second re-analysis return point being the configuration information acquisition phase, the processor is configured to execute the instructions to cause the risk analysis apparatus to:
acquire, in the configuration information acquisition phase of the second re-analysis, new configuration information;
analyze, in the threat analysis phase of the second re-analysis, a way of attack based on the new configuration information and vulnerability information;
generate, in the attack route generation phase of the second re-analysis, a new attack route based on the new configuration information and the way of attack; and
calculate, in the risk value calculation phase of the second re-analysis, a risk value of the new attack route.

9. A risk analysis method, comprising:
acquiring configuration information of a system to be analyzed during a configuration information acquisition phase;
analyzing a way of attack implementable in the system based on the configuration information and vulnerability information during a threat analysis phase;
generating a first attack route from a start point to an end point of an attack based on the configuration information and the way of attack during an attack route generation phase;
calculating a risk value of the first attack route during a risk value calculation phase;
outputting a risk analysis result comprising the calculated risk value;
in response to a security measure planned for the system, conducting a first re-analysis of risks by selecting a first re-analysis return point from the configuration information acquisition phase, the threat analysis phase, the attack route generation phase, or the risk value calculation phase based on the planned security measure, and initiating the first re-analysis from the selected first re-analysis return point;
detecting a change in the vulnerability information or the configuration information; and
in response to detecting the change, conducting a second re-analysis of risks by selecting a second re-analysis return point from the configuration information acquisition phase, the threat analysis phase, the attack route generation phase, or the risk value calculation phase based on the content of the detected change,
wherein generating the first attack route comprises generating the first attack route up to a first hop number, and
wherein conducting the first re-analysis or the second re-analysis comprises generating the first attack route up to a second hop number greater than the first hop number.

10. A non-transitory computer-readable medium storing a program that, when executed by a processor, causes the computer to:
acquire configuration information of a system to be analyzed during a configuration information acquisition phase;
analyze a way of attack implementable in the system based on the configuration information and vulnerability information during a threat analysis phase;
generate a first attack route from a start point to an end point of an attack based on the configuration information and the way of attack during an attack route generation phase;
calculate a risk value of the first attack route during a risk value calculation phase;
output a risk analysis result comprising the calculated risk value;
in response to a security measure planned for the system, conduct a first re-analysis of risks by selecting a first re-analysis return point from the configuration information acquisition phase, the threat analysis phase, the attack route generation phase, or the risk value calculation phase based on the planned security measure, and initiating the first re-analysis from the selected first re-analysis return point;
detect a change in the vulnerability information or the configuration information; and
in response to detecting the change, conduct a second re-analysis of risks by selecting a second re-analysis return point from the configuration information acquisition phase, the threat analysis phase, the attack route generation phase, or the risk value calculation phase based on the content of the detected change,
wherein generating the first attack route comprises generating the first attack route up to a first hop number, and
wherein conducting the first re-analysis or the second re-analysis comprises generating the first attack route up to a second hop number greater than the first hop number.

* * * * *